United States Patent
Kawano

(10) Patent No.: US 6,437,331 B1
(45) Date of Patent: Aug. 20, 2002

(54) BOLOMETER TYPE INFRARED SENSOR WITH MATERIAL HAVING HYSTERISIS

(75) Inventor: Masaya Kawano, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/373,570

(22) Filed: Aug. 13, 1999

(30) Foreign Application Priority Data

Aug. 13, 1998 (JP) ............................................ 10-229010

(51) Int. Cl.[7] .............................................. H01L 31/08
(52) U.S. Cl. ................................ 250/338.3; 250/338.4; 250/338.1; 250/332
(58) Field of Search ......................... 250/338.3, 338.4, 250/338.1, 332

(56) References Cited

U.S. PATENT DOCUMENTS

| | | | |
|---|---|---|---|
| 5,196,703 A | 3/1993 | Keenan | |
| 5,288,649 A | 2/1994 | Keenan | |
| 5,367,167 A | 11/1994 | Keenan | |
| 5,801,383 A | 9/1998 | Wada et al. | |

FOREIGN PATENT DOCUMENTS

| | | |
|---|---|---|
| JP | 4-60426 | 2/1992 |
| JP | 5-206526 | 8/1993 |
| JP | 6-137940 | 5/1994 |
| JP | 7-181082 | 7/1995 |
| JP | 8-128889 | 5/1996 |
| JP | 2655101 | 5/1997 |
| JP | 9-145481 | 6/1997 |
| JP | 9-257565 | 10/1997 |
| JP | 9-264591 | 10/1997 |
| JP | 11-271145 | 10/1999 |

OTHER PUBLICATIONS

Jorgenson et al.; "Doped Vanadium Oxide For Optical Switching films"; Solar Energy Materials; vol. 14; 1986; pp. 205–214.

Kuwamoto et al; "Electrical Properties of the $(V_{1-x}Cr_x)_2O_3$ System"; Pysical Review B; vol. 22, No. 6; Sep. 15, 1980; pp. 2626–2636.

Jin et al.; "Dependence of Microstructure and Thermochromism on Substrate Temperature for Sputter Deposited $VO_2$ Epitaxial Films"; J. Vac. Sci. Technol; vol. A15, No 3; May/Jun. 1997; pp. 1113–1117.

Primary Examiner—Constantine Hannaher
Assistant Examiner—Andrew Israel
(74) Attorney, Agent, or Firm—Foley & Lardner

(57) ABSTRACT

An infrared ray sensor includes two electrode lines, a heat sensing section and a control unit. The heat sensing section is connected between the two electrode lines, and includes a film formed of a material in which resistivity of the material changes along a hysteresis curve depending on temperature change. The heat sensing section receives an infrared ray to change the resistivity. The control unit is connected to between the two electrode lines. The control unit operates to the heat sensing section such that the heat sensing section undergoes a temperature cycle. The temperature cycle is composed of a temperature increasing process and a temperature decreasing process, and the resistivity of the material changes along a part of the hysteresis curve during the temperature cycle. Also, the control unit detects a temperature due to the infrared ray based on a result of the temperature cycle.

18 Claims, 4 Drawing Sheets

BOLOMETER TYPE INFRARED SENSOR WITH MATERIAL HAVING HYSTERISIS

BACKGROUND OF THE INVENTION

1. Field of the Invention

The present invention relates to a bolometer type infrared sensor, and more particularly to a bolometer type infrared sensor in which a bolometer material having hysteresis in resistance—temperature characteristic is used.

2. Description of the Related Art

A bolometer type infrared sensor is a sensor in which infrared rays are irradiated to a bolometer material that is separated in heat from a substrate and in which the infrared rays are detected based on a resistance change which is caused by a temperature change.

As the bolometer material of such a bolometer type infrared sensor, it is preferable for the bolometer material to have a high temperature coefficient of resistance (TCR) %/K which is a resistance change percentage for every degree of temperature change. Materials having such a characteristic are reported in metal, metallic oxide, and a semiconductor. For example, in Japanese Laid Open Patent Application (JP-A-Heisei 5-206526) and U.S. Pat. Nos. 5,288,649 and 5,367,169, the technique is disclosed in which amorphous silicon (a-Si) doped into an n-type or a p-type semiconductor is used as the bolometer material. Also, vanadium oxide or a bolometer material in which vanadium oxide is used as a base bolometer material are often used for the bolometer. Those characteristics are reported in reference (Solar Energy Materials 14, 205 (1986)) and the reference (Physical Review B 22, 2626 (1980)).

The bolometer material of an a-Si system has a relatively high value of TCR of 3%/K but has a higher resistivity than 1000 $\Omega$cm. When the resistivity is high, a large Johnson noise is generated when the resistance value of the diaphragm is read out. As a result, substantial sensitivity to the infrared rays is not increased so much. On the contrary, when the resistivity is very small, the influence of the wiring resistance appears and the high sensitivity is not attained. Therefore, the resistivity is desirable in a range of 0.01 to 1 $\Omega$cm.

On the other hand, the resistivity is as relatively low as 0.1 $\Omega$cm in the bolometer material composed of vanadium oxide or containing it as the base bolometer material and a sensor having a TCR value of about 2%/K has been obtained. However, to aim at the sensor having higher sensitivity, it is necessary for the sensor to have a larger TCR value. To attain such a larger TCR value by use of vanadium oxide, a way of using the phase transition of vanadium oxide could be considered. The resistance change of equal to or more than 2 digits is generally observed before and after the phase transition of vanadium oxide. Also, by doping various metal elements in vanadium oxide, the transition temperature can be controlled to a suitable temperature. For these reasons, a high sensitive infrared ray detection characteristic can be expected if vanadium oxide is used as the material of the bolometer.

However, it is known that the resistivity of vanadium oxide has a hysteresis to the cycle of the temperature change. Conventionally, the bolometer material having a hysteresis in the resistivity temperature characteristic could not be used for the infrared ray sensing unit for the following reasons.

FIG. 5 is a diagram illustrating a hysteresis curve of a bolometer material having a hysteresis in the resistivity temperature characteristic. In FIG. 5, it is supposed that a stable phase on a lower temperature side is a first phase and a stable phase on the higher temperature side is a second phase. In the following description, a point in the figure, i.e., a set of a bolometer temperature and a bolometer resistance corresponding to the bolometer temperature is shown as a state of the bolometer A resistivity $\rho$ of the bolometer material in FIG. 5 changes as follows with the temperature change. A logarithm of the resistivity is indicated in FIG. 5.

First, a bolometer temperature is increased from the state a of the first phase. At this time, the resistivity changes gently until the bolometer temperature reaches a temperature corresponding to a critical state b. When the bolometer temperature is increased beyond the critical state b, the phase transition begins so that the resistivity decreases rapidly. Then, when the bolometer temperature reaches a temperature corresponding to a state c, the rapid change of the resistivity happens no longer, even if the bolometer temperature is increased. The resistivity changes gently again.

That is, the bolometer material undergoes the phase transition from the first phase to the second phase while the bolometer state changes from the state b to the states c. The phase transition is completed at the critical state c so that the bolometer state changes to the second phase which is the stable phase on the higher temperature side. The curve bc is referred to as a temperature increasing curve in the following description.

On the other hand, the bolometer temperature of the bolometer material is decreased from the state f in the second phase. At this time, even if the bolometer temperature reaches the temperature corresponding to the state c, the phase transition does not happen. Therefore, the bolometer material maintains a second phase. In this temperature region, the resistivity of the bolometer material changes gently. When the bolometer temperature is further decreased so that the bolometer temperature reaches a temperature corresponding to the state d, the phase transition begins so that the resistivity increases rapidly. The rapid increase of the resistivity continues to the temperature corresponding to state e. Then, when the bolometer temperature is further decreased to pass through the state e, the resistivity of the bolometer material changes gently in this temperature region.

The curve de is referred to as a temperature decreasing curve in the following description. The bolometer material performs the phase transition from the second phase to the first phase in the temperature region corresponding to the temperature decreasing curve.

The point to which an attention should be paid when the bolometer material is used is that the phase transitions shown by the temperature increasing curve and the temperature decreasing curve are a non-reversible process.

Now, it is supposed that the state of the bolometer material is changed from the state a of the first phase via the critical state b to one point p1 on the temperature increasing curve, and then the temperature is decreased. In this case, the state of the bolometer material does not change along the temperature increasing curve from state p1 to the critical state b in an opposite direction. The state of the bolometer material changes from state p1 to the lower temperature side in approximately parallel to curve a–b. That is, the state of the bolometer material changes from the point p1 to the left side in FIG. 5.

Then, while the state of the bolometer material reaches the state shown by the point p in FIG. 5 via the above process, the resistivity gently changes along the curve p–p1 in FIG. 5, if the temperature of the bolometer material is increased again. Thereafter, when the state of the bolometer material reaches the point p1 on the temperature increasing curve, the resistivity begins to change rapidly along the temperature increasing curve.

The similar phenomenon occurs in the bolometer material when the temperature is decreased from the state f in the second phase.

Now, it is supposed that the state of the bolometer material changes from the state f in the second phase to a state p2 on the temperature decreasing curve via the critical state d and then the temperature is increased again. In this case, the state of the bolometer material does not change from the state p2 to the critical state d on the temperature decreasing curve in the opposite direction. The state of the bolometer material changes from the state p2 to a point on the higher temperature side in approximately parallel to curve d–f. That is, the state of the bolometer changes from the point p2 to the right side in FIG. 5.

Then, when the state of the bolometer material reaches a point shown by the point p in FIG. 5 via the above process, the resistivity gently changes along the curve p–p2 in FIG. 5, if the temperature of the bolometer material is decreased again. Thereafter, the state of the bolometer material reaches the point p2 on the temperature decreasing curve, so that the state of the bolometer material begins to change rapidly along the temperature decreasing curve.

Therefore, to attain high infrared ray detection sensitivity by use of the phase transition, it could be considered that the bolometer material having the physical chemistry structure corresponding to the one p1 on the temperature increasing curve is used. That is, it could be considered to use the bolometer material having a crystal structure and crystal incompleteness when the bolometer material is a single crystal, and the crystal structure, the crystal incompleteness and an energy state of crystal grain when the bolometer material is polycrystalline. In this case, for example, the state of the bolometer material is set to the state p1 on the temperature increasing curve in FIG. 5, and next the temperature is decreased so that the state of the bolometer material is set to a state p. Thus, the phase transition can be realized. However, in this case, if the operation temperature is not set to the transition temperature corresponding to the state p1, the sensitive resistivity change along a hysteresis curve can not be realized.

However, the conventional bolometer operates at an ambient temperature. Therefore, even if the physical chemistry structure of the bolometer material is identical with the physical chemistry structure corresponding to the state on the hysteresis curve, the rapid resistivity change along the hysteresis curve can always not be realized.

This problem will be specifically described below.

The temperature resolution (NETD) of the infrared sensor is typically about 0.1° C. Therefore, the temperature change of the bolometer due to the infrared rays from a subject is approximately equal to this order. As a result, generally, the temperature change of a heat sensing section is small sufficiently than the temperature width ΔTt of the hysteresis. In case of the bolometer material of $VO_2$, it is reported that the temperature width ΔTt of the hysteresis is 1° C. When the bolometer material is a bulk single crystal, is 2° C. when the bolometer material is a polycrystalline film, and is 10° C. when the bolometer material is a low crystal film (J. Vac. Sci. Tchnol. A15, 1113 (1997)). Also, it is reported that the temperature width ΔTt of the hysteresis is 50° C. When the bolometer material is formed of $V_2O_3$ with Cr of 1 mol % doped ((Physical Review B 22, 2626 (1980)).

When the infrared rays are incident on the bolometer in the state p (temperature Tobj) of the figure under the above condition, the bolometer resistance value changes as shown by the solid line arrow in the temperature width of the hysteresis. At this time, because the temperature change ΔTobj of the bolometer is smaller than the temperature width ΔTt of the hysteresis curve, the temperature Tobj of the bolometer does not reach a transition temperature T1 corresponding to the point p1 on the temperature increasing curve. Therefore, the phase transition does not occur. As a result, a high TCR value is not attained and a high infrared ray detection sensitivity is not attained.

Moreover, in a case where the bolometer material having a hysteresis is used for the bolometer, the bolometer cannot be used, if the temperature history is not clear, i.e., it is not clear whether the bolometer material is in the temperature increasing process or in the temperature decreasing process. For example, to realize the state p in FIG. 5, there are two heat-treatment processes.

The first process starts from the state a in the first phase and reaches the state p1 on the temperature increasing curve via the critical state b, and then reaches the state p from the state p1 by decreasing the temperature. The second process starts from the state f in the second phase and reaches the state p2 on the temperature decreasing curve via the critical state d, and then reaches the state p from the state p2 by increasing the temperature.

When the bolometer temperature is increased from Tobj corresponding to the state p attained through the first process, the resistivity ρ (log ρ in FIG. 5) changes gently along the curve p–p1. When the temperature of the bolometer material reaches T1 corresponding to state p1, the resistivity changes rapidly with the temperature increase. However, when the temperature of this bolometer material is decreased from Tobj corresponding to the state p, the resistivity changes gently approximately along the prolongation of the straight line p1–p. At this time, even if the prolongation intersects the temperature decreasing curve, the resistivity change gently without phase transition. This is because only the temperature of the bolometer material changes in the condition in which the physical chemistry structure in the state p1 is fixed. Unless the temperature returns to the state p1 again, the phase transition can not be performed.

When the temperature of the bolometer material is decreased from Tobj corresponding to the state p attained through the second process, the resistivity ρ changes gently along the curve p–p2. When the temperature of the bolometer material reaches the temperature corresponding to state p2, the resistivity is increased rapidly with the temperature decrease. However, when the temperature of the bolometer material is increased from Tobj corresponding to the state p, the resistivity changes gently approximately along the prolongation of the straight line p2–p. At this time, even if the prolongation intersects the temperature increasing curve, the resistivity continues gentle change just as it is without phase transition. This is because only the temperature of the bolometer material changes in the condition in which the physical chemistry structure corresponding to the state p2 on the temperature decreasing curve is fixed. Unless the temperature returns to the temperature corresponding to state p2 again, the phase transition does not occurs.

For these reasons, even if the bolometer materials have the same chemical composition and the same doping density, and are in the same state p, the-bolometers performs contrary operations based on the heat-treatment history. This is the second reason why the bolometer material having a hysteresis can not be used for the bolometer. For the above reasons, there is no report in which the bolometer material having the hysteresis is applied to the bolometer type infrared sensor.

In conjunction with the above description, an infrared sensing apparatus is described in Japanese Laid Open Patent Application (JP-A-Heisei 7-181082). In this reference, an infrared radiating body (29) is provided under a cold side (28) of a thermocouple (25) through an interlayer insulating film to thermally connect the thermocouple to the infrared radiating body (29). A diagnosis circuit (33) applies a voltage to the infrared radiating body (29) for every given time interval or at a given timing to detect thermal electromotive force, whereby to diagnose the thermocouple (25).

Also, a method of controlling electric characteristic of vanadium oxide is described in Japanese Laid Open Patent Application (JP-A-Heisei 9-145481). In this reference, sample wafers (1) having vanadium oxide films ($V_2O_5$) with 5 valences are located in a sample holder (2) and subjected to heat treatment using a mixture gas of argon and hydrogen. The heat treatment temperature is in a range of 350 to 450° C. In this way, vanadium oxide films ($V_2O_5$) with 5 valences is converted into vanadium oxide films ($VO_2$) with 4 valences and then vanadium oxide films ($V_2O_3$) with 3 valences. The resistivity of the vanadium oxide is controlled.

Also, a bolometer type infrared sensor is described in Japanese Laid Open Patent Application (JP-A-Heisei 9-257565). In this reference, a vanadium pentoxide is formed by a sputtering method or a sol-gel method and is subjected to heat treatment using a mixture gas of argon and hydrogen. Thus, a vanadium oxide film VOx is obtained, where $1.875<x<2.0$. The vanadium oxide film has no metal-semiconductor transition at about 70° C., unlike a typical $VO_2$ film.

Also, a gas detecting apparatus is described in Japanese Laid Open Patent Application (JP-A-Heisei 9-264591). In this reference, the gas detecting apparatus includes a sensor element (102) having a an active film used to detect a gas, and sensing the gas in attribute and density, a heater (103) heating the sensor element, a control unit (101) reading the sensing result of the sensor element to generate a control signal, and a heater adjuster (106) adjusting the temperature of the sensor element. The temperature change of the sensor element is repeated periodically in a predetermined time period or in different time periods. The temperature increase width is different from the temperature decrease width and the temperature change is compared with a hysteresis of temperature control to detect the concentration of the gas.

Also, an infrared sensor is described in Japanese Patent No. 2655101. In this reference, the infrared sensor is composed of a bolometer vanadium oxide film formed on a support film which is thermally isolated from a substrate through a gap between the support film and the substrate, a first protection film of a vanadium pentoxide film formed to cover the bolometer vanadium oxide film, and a second protection film formed a surface portion including t he first protection film .

SUMMARY OF THE INVENTION

Therefore, an object of the present invention is to provide a bolometer type infrared sensor in which a bolometer material having a hysteresis in resistivity temperature characteristic is used.

Another object of the present invention is to provide a bolometer type infrared sensor which uses phase transition.

In order to achieve an aspect of the present invention, an infrared ray sensor includes two electrode lines, a heat sensing section and a control unit. The heat sensing section is connected between the two electrode lines, and includes a film formed of a material in which resistivity of the material changes along a hysteresis curve depending on temperature change. The heat sensing section receives an infrared ray to change the resistivity. The control unit is connected to between the two electrode lines. The control unit operates to the heat sensing section such that the heat sensing section undergoes a temperature cycle. The temperature cycle is composed of a temperature increasing process and a temperature decreasing process, and the resistivity of the material changes along a part of the hysteresis curve during the temperature cycle. Also, the control unit detects a temperature due to the infrared ray based on a result of the temperature cycle.

The control unit preferably supplies pulse power to the heat sensing section for every temperature cycle. In this case, the temperature increasing process is performed through heat generation due to the pulse power, and the temperature decreasing process is performed through heat radiation. Also, the control unit supplies pulse power to the heat sensing section such that an inequality (1) is satisfied:

$$\Delta Tc > \Delta Tt + |\Delta Tobj| \tag{1}$$

where $\Delta Tc$ is a temperature change width in the temperature cycle, $\Delta Tt$ is a temperature width of the hysteresis curve, and $|\Delta Tobj|$ is an absolute value of a temperature change due to the infrared ray.

It is preferable that the film is formed of $VO_2$ having oxygen defects, and has a temperature coefficient of resistance equal to or more than 10%/K.

In order to achieve another aspect of the present invention, an infrared ray sensor includes a plurality of heat sensors and a control unit. The plurality of heat sensors are arranged in a matrix, and each of the plurality of heat sensors includes a film formed of a material in which resistivity of the material changes along a hysteresis curve depending on temperature change. The heat sensing section receives an infrared ray to change the resistivity. The control unit operates to each of the plurality of heat sensors such that each heat sensor undergoes a temperature cycle. The temperature cycle is composed of a temperature increasing process and a temperature decreasing process, and the resistivity of the material changes along a part of the hysteresis curve during the temperature cycle. The control unit detects a temperature of the each heat sensor due to the infrared ray based on a result of the temperature cycle.

The control unit supplies pulse power to the each heat sensor for every temperature cycle. In this case, the temperature increasing process is performed through heat generation due to the pulse power, and the temperature decreasing process is performed through heat radiation. Also, the control unit supplies pulse power to the each heat sensor such that an inequality (1) is satisfied:

$$\Delta Tc > \Delta Tt + |\Delta Tobj| \tag{1}$$

where $\Delta Tc$ is a temperature change width in the temperature cycle, $\Delta Tt$ is a temperature width of the hysteresis curve, and $|\Delta Tobj|$ is an absolute value of a temperature change due to the infrared ray.

It is preferable that the film is formed of $VO_2$ having oxygen defects, and has a temperature coefficient of resistance equal to or more than 10%/K.

In order to achieve still another aspect of the present invention, a method of detecting a temperature due to an infrared ray, includes:

making a heat sensing section undergo temperature cycles, wherein the temperature cycle is composed of a temperature increasing process and a temperature decreasing process; and detecting a temperature due to the infrared ray based on a result of each of the temperature cycles.

To make a heat sensing section undergo temperature cycles, pulse power is supplied to the heat sensing section for every temperature cycle. In this case, the temperature increasing process is performed through heat generation due to the pulse power, and the temperature decreasing process is performed through heat radiation.

The supply of the pulse power to the heat sensing section is performed such that an inequality (1) is satisfied:

$$\Delta Tc > \Delta Tt + |\Delta Tobj| \tag{1}$$

where $\Delta Tc$ is a temperature change width in the temperature cycle, $\Delta Tt$ is a temperature width of the hysteresis curve, and $|\Delta Tobj|$ is an absolute value of a temperature change due to the infrared ray.

It is preferable that the heat sensing section is formed of $VO_2$ having oxygen defects, and has a temperature coefficient of resistance equal to or more than 10%/K.

In order to achieve yet still another aspect of the present invention, an infrared ray sensor includes two electrode lines, and a heat sensing section connected between. said two electrode lines, and thermally separated from a peripheral object. The heat sensing section includes a supporting film, and a film formed of a material having a hysteresis in a resistivity temperature characteristic.

DESCRIPTION OF THE PREFERRED EMBODIMENTS

Next, a bolometer type infrared sensor of the present invention will be described below in detail with reference to the attached drawings.

Figure 1A:
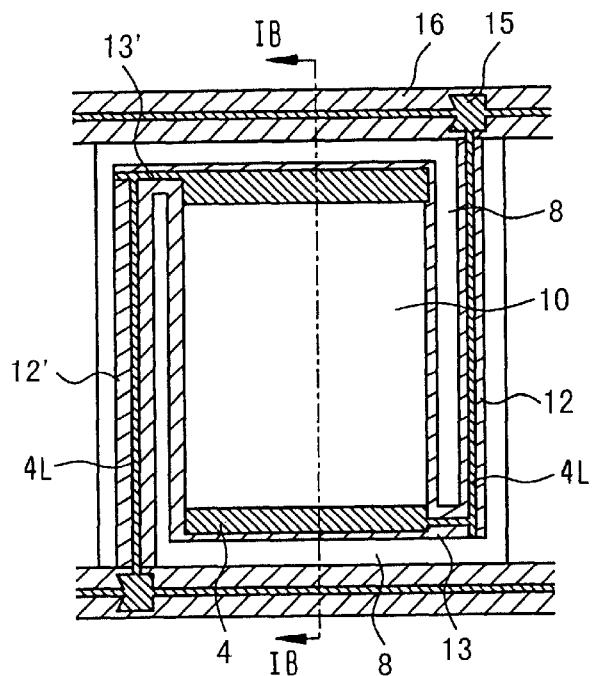
FIG. 1A is a plan view illustrating the structure of a bolometer type infrared sensor of the present invention and FIG. 1B is a cross-sectional view illustrating the structure of the bolometer type infrared sensor of the present invention taken along line IB—IB of FIG. 1A.
Figure 1B:
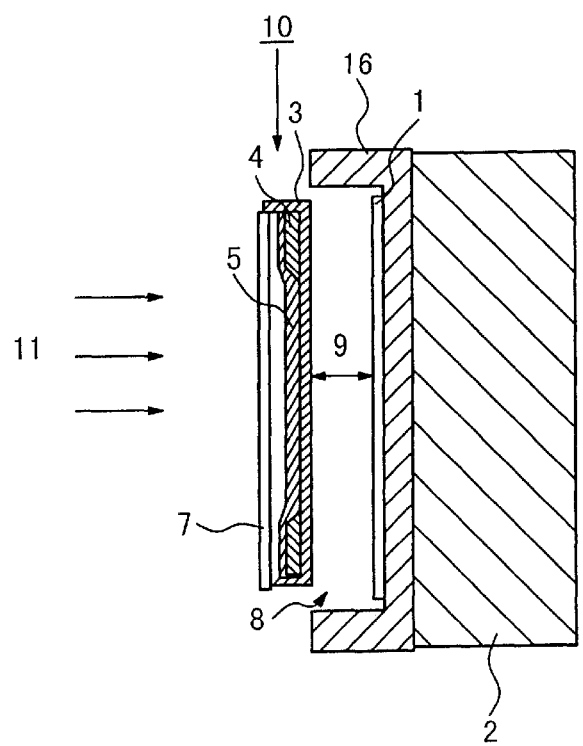

FIGS. 1A and 1B show the structure of a conventional example of the bolometer type infrared sensor. FIG. 1A is a plan view of the bolometer type infrared sensor, and FIG. 1B is a cross-sectional view of the bolometer type infrared sensor taken along line IB—IB of FIG. 1A.

As shown in FIG. 1B, a diaphragm 10 is composed of a bolometer film 5 and a supporting film 3 formed under the bolometer film 5, a protecting film formed on the surface of the bolometer film 5, and an infrared absorbing film 7 formed on the surface of the protecting film. Also, the diaphragm 10 has electrodes 4 on both edges of the bolometer film 5. The electrode 4 is connected with an electrode wiring line 4L, and a voltage is applied between the electrodes 4 via the electrode wiring lines 4L. A resistance change of the bolometer film 5 due to a temperature change is detected when the infrared rays are irradiated. Thus, the infrared rays are detected.

In this infrared sensor, the structure is adopted in which the diaphragm 10 is suspended in a floating state by beams 12 and 12' to be thermally separated from a substrate 2. Thus, the bolometer film 5 is separated in heat from another component.

A perfect reflecting film 1 is provided on the substrate 2. A cavity 9 is provided between the reflecting film 1 and the diaphragm 10. The distance between the reflecting film 1 and the diaphragm 10 is set to an optimum value. As a result, most of the incident infrared rays 11 are absorbed by the diaphragm 10 containing the bolometer film 5 without a loss of the incident infrared rays 11 absorbed by the infrared absorbing film. In this way, the temperature of the diaphragm 10 is increased so that the resistance of the bolometer film 5 changes. In FIG. 1B, the banks 16 on the substrate 2 form side walls of the cavity 9, and the diaphragm 10 is separated from the banks 16 in heat by slits 8. It should be noted that reference numerals 13 and 13' of FIG. 1A are the bases of the beams 12 and 12', respectively. A reference numeral 15 is the electrode wiring contact.

The infrared ray detector is composed of a voltage source 12, a switch circuit 14, a bolometer type infrared sensor 16 as shown in FIGS. 1A and 1B, a current detector 18 and a controller and detector 20.

The voltage source 12 periodically supplies a voltage to the infrared sensor 16. The voltage is desirable to have a predetermined voltage value and to be output for a predetermined time period. The voltage value and the time period determine the temperature increasing process. The voltage source 12 is preferably a constant voltage source.

The switch circuit 14 gates the voltage supplied from the voltage source 12 to the infrared sensor 16 in response to a control signal supplied from the controller 20.

The current detector 18 detects current flowing through the infrared sensor 16 and outputs the current detecting result to the detector 20.

The controller and detector 20 outputs the control signal to the switch circuit 14 based on the current detecting result from the detector 18 or a setting value by a user. Also, the controller and detector 20 calculates a resistance of the infrared sensor 16 from the current detecting result from the detector 18 and the voltage supplied from the voltage source 12, and determines a temperature based on the resistance of the infrared sensor 16.

Figure 2:
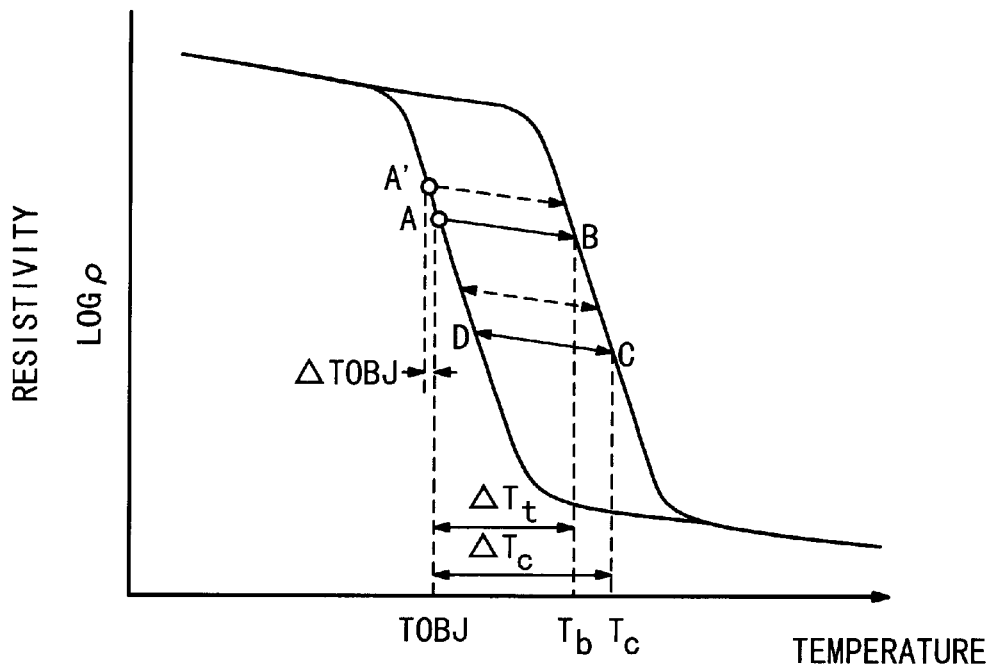
FIG. 2 is a diagram illustrating resistivity temperature characteristic of the infrared sensor which is used to describe a operation principle of the infrared sensor of the present invention.

FIG. 2 is a diagram illustrating the resistivity temperature characteristic of the bolometer heat sensing section used to describe the operation principle of the infrared sensor of the present invention. In FIG. 2, the resistivity $\rho$ of the bolometer material is shown in a log $\rho$ scale. In the bolometer, a temperature increasing process and a temperature decreasing process are always periodically repeated by the temperature width $\Delta Tc$ which is larger than the temperature width ΔTt of the hysteresis. Here, ΔTc is set to satisfy an inequality $$\Delta Tc > \Delta Tt + \Delta Tmax$$

where ΔTmax is the maximum of the temperature change of the bolometer heat sensing section which is caused by the expected infrared ray change.

Now, when the infrared ray quantity is equal to the reference value, the bolometer is set to the state A corresponding to the temperature Tobj on the temperature decreasing curve, and a temperature cycle is started. First, when the temperature increasing process is started, the bolometer temperature is increased without being accompanied by the change in physical chemistry structure. The resistivity curve shown by A→B in the figure crosses with the temperature increasing curve at the state B. Because ΔTc>ΔTt, the bolometer temperature is further increased. When exceeding the temperature Tb corresponding to the state B, the bolometer temperature is increased with the physical chemistry structure change and the bolometer state reaches the state C corresponding to the temperature Tc (=Tobj+ΔTc).

Next, when the temperature decreasing process is started, the bolometer temperature is decreased without being accompanied by the physical chemistry structure change. The resistivity curve shown by C→D in the figure crosses with the temperature decreasing curve at the state D. The bolometer temperature is decreased from the temperature corresponding to the state D to the first temperature Tobj with the physical chemistry structure change.

When the infrared ray quantity is decreased, this heat quantity reduction functions to decrease the bolometer temperature by ΔTobj, if the heat quantity radiated from the bolometer through the decrease of the infrared light quantity during the temperature cycle is constant. Therefore, the temperature cycle shifts to the lower temperature side, i.e., to the left direction in the figure by ΔTobj. The point A' in FIG. 2 is the next temperature cycle start point. In this way, because ΔTobj is detected, the change of the infrared ray quantity can be detected as high TCR is maintained.

In the embodiment shown in FIG. 2, a case was described where the start point of the temperature cycle is on the temperature decreasing curve. However, the similar result can be attained even if the start point of the temperature cycle is set to a point displaced from the hysteresis curve.

Figure 3:
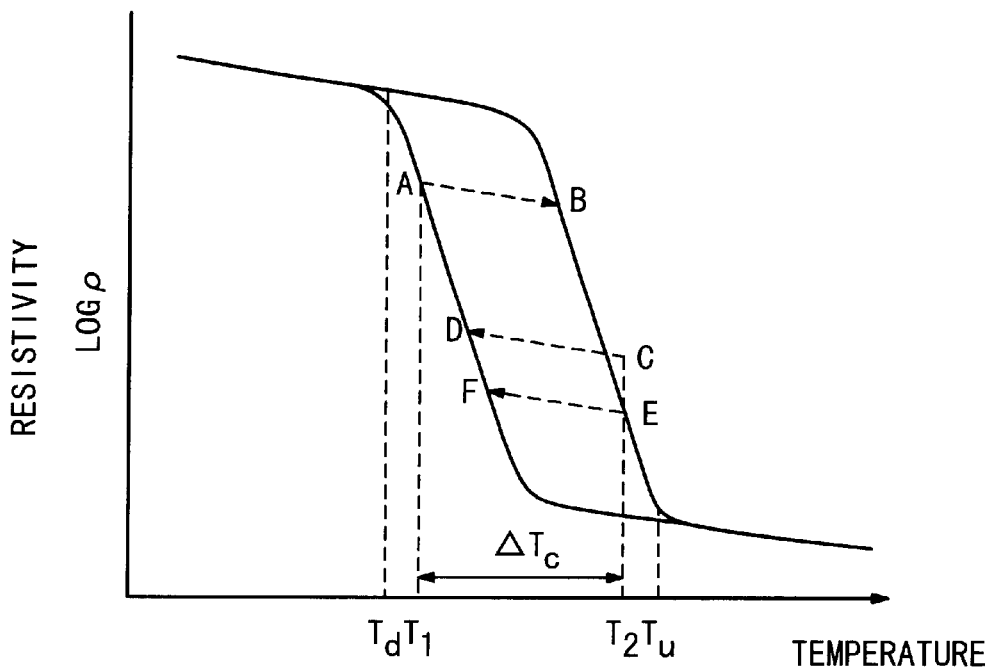
FIG. 3 is a diagram illustrating the resistivity temperature characteristic of the infrared sensor which is used to describe a temperature cycle in which a start point of the temperature cycle is a point out of a hysteresis curve.

FIG. 3 shows an example of the temperature cycle when the start point of the temperature cycle is set to the point displaced from the hysteresis curve. In FIG. 3, a point C outside the temperature increasing curve on the higher temperature side is set as the start point of the temperature cycle. The bolometer temperature is decreased first and then is increased next. The temperature region where the temperature cycle is performed is in a range of T1 to T2. This temperature region is in the temperature region TD–TU in which hysteresis of the resistivity temperature characteristic is caused. The temperature change width is ΔTc>ΔTt.

Referring to FIG. 3, the temperature cycle is started from the state C corresponding to the temperature T2 and the bolometer temperature is decreased. The bolometer temperature crosses with the temperature increasing curve and reaches the point D on the temperature decreasing curve without a physical chemistry structure change. Moreover, when the bolometer temperature is decreased, the bolometer temperature reaches the state A corresponding to the temperature T1 along the temperature decreasing curve while the bolometer material changes the physical chemistry structure. In the following temperature increasing process, the bolometer material reaches state B on the temperature increasing curve without causing a physical chemistry structure change. When the temperature of the bolometer material is further increased, the bolometer material reaches a point E corresponding to the temperature T2 on the temperature increasing curve along the temperature increasing curve while the physical chemistry structure changes.

Thus, the first temperature cycle ends. The second temperature cycle is started from the point E on the temperature increasing curve. Therefore, the same operation as the temperature cycle shown in FIG. 2 is performed. Therefore, when the infrared ray detection is performed in the temperature cycle after the second cycle, the same way as shown in FIG. 2 can be applied.

The condition when the bolometer type infrared sensor of the present invention performs a stable operation is to determine ΔTc satisfying $$\Delta Tc > \Delta Tt + |\Delta Tobj| \quad (1)$$

where ΔTc is the temperature difference in the temperature cycle, and ΔTobj is the temperature change due to the infrared ray quantity change after one period of the temperature cycle. Also, the condition is to set the temperature region of the temperature cycle to the temperature region TD–TU in the bolometer resistivity temperature hysteresis characteristic.

To realize a temperature cycle, an electric current is supplied to the bolometer intermittently so that Joule heat is generated in the infrared sensor of the present invention. Thus, the infrared sensor does not need the special temperature increase and temperature decrease apparatus, and this could realize a compact sensor. Also, at the same time, the measurement of a resistance value is performed using the electric current. Such an electric current control and resistance value reading operation are performed by an IC circuit which is provided in the substrate 2 in the neighborhood of the device.

Figure 4:
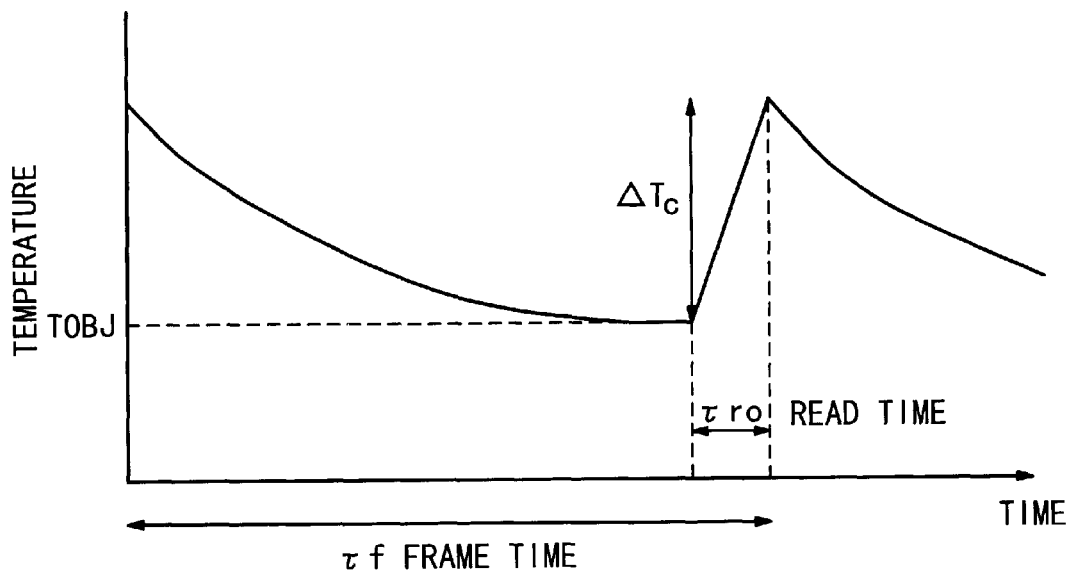
FIG. 4 is a diagram illustrating the temperature cycle which includes a temperature increasing process and a temperature decreasing process.
Figure 5:
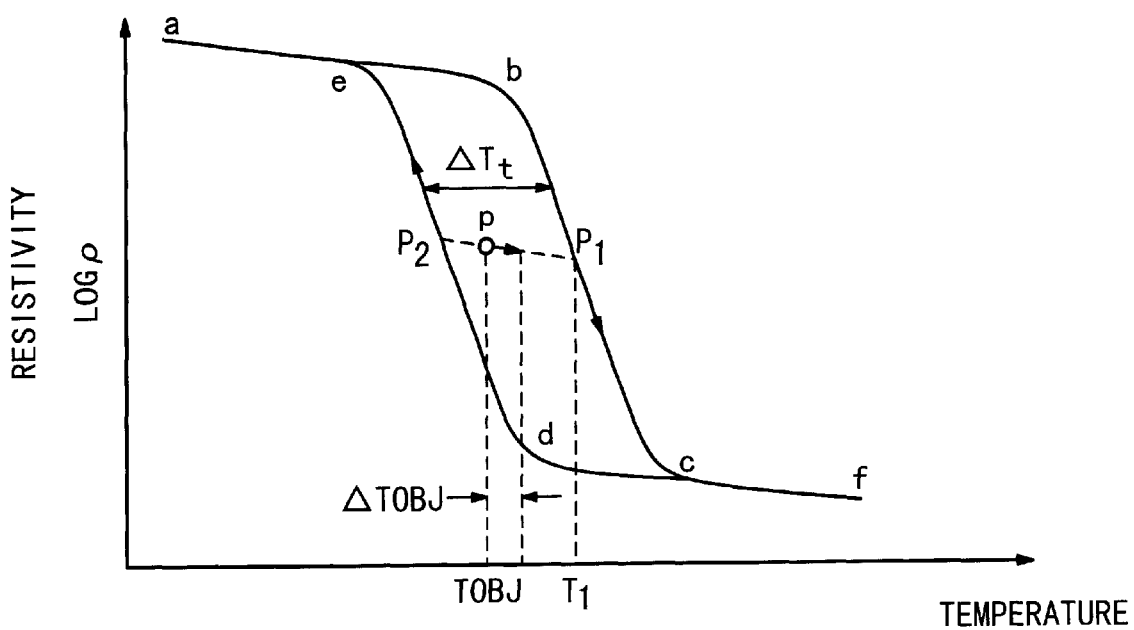
FIG. 5 is a diagram illustrating the resistivity temperature characteristic of a bolometer material in the infrared sensor.
Figure 6:
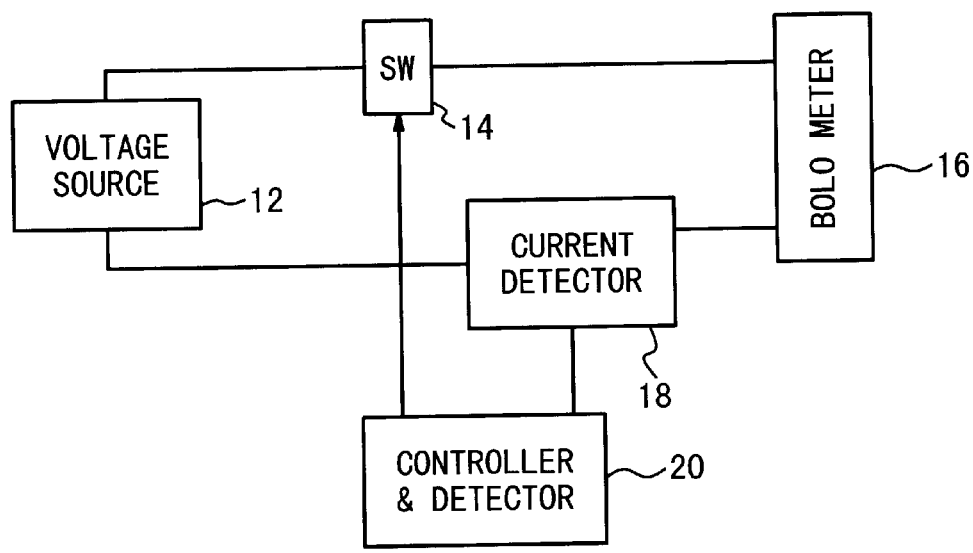
FIG. 6 is a circuit block diagram illustrating the structure of the bolometer type infrared sensor.

FIG. 4 is a diagram to explain the temperature cycle in which the electric current is supplied to the bolometer and temperature increasing process and the temperature decreasing process are repeated for every frame. The resistance value is measured by the applied voltage and the flowing electric current.

The temperature difference ΔTc in this case is $$\Delta Tc = VB2(1-\exp(-\tau ro/\tau T))/G \cdot RB \quad (2)$$

where VB is a bias voltage which is applied to the bolometer, τro is a read time and τT is a heat time constant, G is a heat conductance and RB is the resistance of the bolometer.

Figure 7:
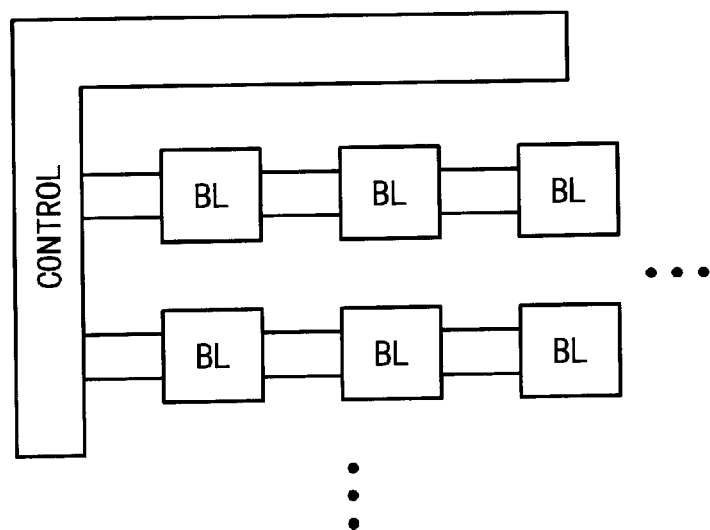
FIG. 7 is a diagram illustrating a plurality of infrared sensors arranged in a matrix.

In this embodiment, the devices shown in FIGS. 1A and 1B are arranged in the 50-$\mu$m interval to form an array device, as shown in FIG. 7. In this case, the switch circuit 14 and the controller and detector 20 are provided in common to the devices or sensors. The current detectors 18 are provided for the sensors, respectively. ΔTc is designed to be 12.9° C. Also, $VO_2$ in which oxygen defects are intentionally increased is used as the bolometer material so that a phase transition point is set to a point near the room temperature. TCR of this film is 10%/K. It should be noted that TCR of $VO_2$ is about 2%/K in the usual region where there is not phase transition. Also, the hysteresis temperature width ΔTt of this film is 5° C. Such bolometer material can not be used in the conventional bolometer type infrared sensor.

When the temperature resolution of the infrared sensor which is attained in this way is measured, the temperature resolution of 0.02K is attained. This is 5 times of sensitivity of the conventional device which uses $VO_2$ with no hysteresis and the sensitive infrared sensor could be realized.

In this way, a periodic temperature shift is given to the bolometer heat sensing section in the temperature cycle. Through this temperature shift, the operation temperature, i.e., the reference temperature used to determine the temperature change which is caused by the irradiated infrared ray quantity change to the bolometer heat sensing section can be detected on the hysteresis curve. Thus, the resistivity change due to the temperature change can be sensitively detected.

Also, the following advantages can be realized by performing this temperature shift periodically:

1) because a temperature shift is periodically performed, an infrared ray detection signal detected as the resistance change can be detected as a periodic signal. Even if the periodic signal is a feeble signal which is buried in noise, it is possible to easily detect by a synchronous signal processing, e.g., a synchronous rectification.

2) By the periodic temperature shift, the operation temperature of the bolometer heat sensing section can be alternately placed on both of two hysteresis curves, i.e., the temperature increasing curve and the temperature decreasing curve. As a result, both of the increase and decrease of the infrared light quantity can be detected.

To realize the above advantage 2) for the stable operation, the temperature width $\Delta Tc$ of the temperature cycle is preferably set as $$\Delta Tc > \Delta Tt + |\Delta Tobj|$$

where $\Delta Tt$ the temperature width of the hysteresis and $\Delta Tobj$ is the temperature change of the bolometer sense heat section which is caused by the infrared ray quantity change after one period of the temperature cycle.

The above setting is based on the following reason. That is, it is necessary that the temperature width $\Delta Tc$ of the temperature cycle as the range of the temperature shift has the temperature width $\Delta Tt$ of the hysteresis at least to use both of two hysteresis curves. However, the following problem occurs when the temperature width $\Delta Tc$ is set as $\Delta Tc = \Delta Tt$. If $\Delta Tobj > 0$, because the bolometer heat sensing part is heated by the infrared rays, the temperature width $\Delta Tc$ of the temperature cycle shifts by $\Delta Tobj$ to the side of the temperature increasing curve. Therefore, the operation temperature of the bolometer heat sensing section is apart from the temperature decreasing curve by $\Delta Tobj$. In this case, the infrared rays can be detected using the temperature increasing curve. However, the infrared rays cannot be detected using the temperature decreasing curve. On contrary, if $\Delta Tobj < 0$, the infrared ray cannot be detected using the temperature increasing curve.

In order to avoid the problem, the addition of $|\Delta Tobj|$ and $\Delta Tt$ is set as temperature width $\Delta Tc$. Therefore, even if there is any positive or negative change in the infrared light quantity, the infrared ray detection which uses the hysteresis curve of the resistivity change characteristic can be attained.

However, even if temperature width $\Delta Tc$ is set in this way, when the temperature cycle is performed in the temperature region which is apart from the hysteresis curve, the hysteresis cannot be used. Therefore, the temperature region for the temperature cycle must be established in the temperature region near the hysteresis curve. That is, the temperature cycle is established in the temperature region which the resistivity change along the hysteresis curve occurs in the temperature cycle.

To realize a temperature cycle, in the embodiment of the present invention, an electric current is applied intermittently to the bolometer heat sensing section to generate Joule heat. In this case, the electric current is supplied such that the temperature increase $\Delta Tc$ by the Joule heat satisfies $$\Delta Tc > \Delta Tt + \text{Become} |\Delta Tobj|$$

Also, the temperature information of the bolometer is read in the embodiment of the present invention while the electric current is supplied to the bolometer.

Moreover, according to the present invention, a plurality of bolometer type devices are arranged in an array and the reading operation of the temperature information is performed by a read circuit provided for each of bolometer type device.

As described above, according to the present invention, the bolometer material having the resistivity temperature hysteresis characteristic is supplied to a periodic temperature bias. A small temperature change is caused by the infrared ray absorption at an optional temperature and is converted into the temperature change in the neighborhood of the phase transition temperature. Thus, it is possible to apply the steep resistivity temperature characteristic change due to the phase transition to the infrared sensor. As a result, the sensitive infrared sensor using a resistivity change through the phase transition of the bolometer material can be realized.

In the above embodiment, the infrared sensor including the temperature cycle function can be realized in compact size at a low cost by applying an electric power cycle to the bolometer material.

What is claimed is:

1. An infrared ray sensor comprising:

two electrode lines;

a heat sensing section connected between said two electrode lines, and including a film formed of a material in which resistivity of said material changes along a hysteresis curve depending on temperature change, wherein said heat sensing section receives an infrared ray to change said resistivity; and a control unit connected to between said two electrode lines, and operating to said heat sensing section such that said heat sensing section undergoes a temperature cycle, wherein said temperature cycle is composed of a temperature increasing process and a temperature decreasing process, and said resistivity of said material changes along a part of said hysteresis curve during said temperature cycle, and said control unit detects a temperature due to said infrared ray based on a result of said temperature cycle.

2. An infrared ray sensor according to claim 1, wherein said control unit supplies pulse power to said heat sensing section for every temperature cycle.

3. An infrared ray sensor according to claim 1, wherein said film is formed of $VO_2$ having oxygen defects.

4. An infrared ray sensor according to claim 1, wherein said film has a temperature coefficient of resistance equal to or more than 10%/K.

5. An infrared ray sensor comprising a plurality of heat sensors, which are arranged in a matrix, and each of which includes a film formed of a material in which resistivity of said material changes along a hysteresis curve depending on temperature change, wherein said heat sensing section receives an infrared ray to change said resistivity; and a control unit operating to each of said plurality of heat sensors such that said each heat sensor undergoes a temperature cycle, wherein said temperature cycle is composed of a temperature increasing process and a temperature decreasing process, and said resistivity of said material changes along a part of said hysteresis curve during said temperature cycle, and said control unit detects a temperature of said each heat sensor due to said infrared ray based on a result of said temperature cycle.

6. An infrared ray sensor according to claim 5, wherein said control unit supplies pulse power to said each heat sensor for every temperature cycle.

7. An infrared ray sensor according to claim 5, wherein said film is formed of $VO_2$ having oxygen defects.

8. An infrared ray sensor according to claim 5, wherein said film has a temperature coefficient of resistance equal to or more than 10%/K.

9. A method of detecting a temperature due to an infrared ray, comprising:

making a heat sensing section undergo temperature cycles, wherein said temperature cycle is composed of a temperature increasing process and a temperature decreasing process; and detecting a temperature due to said infrared ray based on a result of each of said temperature cycles.

10. A method according to claim 9, wherein said making includes supplying pulse power to said heat sensing section for every temperature cycle.

11. A method according to claim 10, wherein said heat sensing section is formed of $VO_2$ having oxygen defects.

12. A method according to claim 10, wherein said film has a temperature coefficient of resistance equal to or more than 10%/K.

13. An infrared ray sensor comprising:

two electrode lines;

a heat sensing section connected between said two electrode lines, and including a film formed of a material in which resistivity of said material changes along a hysteresis curve depending on temperature change, wherein said heat sensing section receives an infrared ray to change said resistivity; and a control unit connected to between said two electrode lines, and operating to said heat sensing section such that said heat sensing section undergoes a temperature cycle, wherein said temperature cycle is composed of a temperature increasing process and a temperature decreasing process, and said resistivity of said material changes along a part of said hysteresis curve during said temperature cycle, and said control unit detects a temperature due to said infrared ray based on a result of said temperature cycle, wherein said control unit supplies pulse power to said heat sensing section for every temperature cycle, and wherein said temperature increasing process is performed through heat generation due to said pulse power, and said temperature decreasing process is performed through heat radiation.

14. An infrared ray sensor comprising:

two electrode lines;

a heat sensing section connected between said two electrode lines, and including a film formed of a material in which resistivity of said material changes along a hysteresis curve depending on temperature change, wherein said heat sensing section receives an infrared ray to change said resistivity; and a control unit connected to between said two electrode lines, and operating to said heat sensing section such that said heat sensing section undergoes a temperature cycle, wherein said temperature cycle is composed of a temperature increasing process and a temperature decreasing process, and said resistivity of said material changes along a part of said hysteresis curve during said temperature cycle, and said control unit detects a temperature due to said infrared ray based on a result of said temperature cycle, wherein said control unit supplies pulse power to said heat sensing section for every temperature cycle, and wherein said control unit supplies pulse power to said heat sensing section such that an inequality (1) is satisfied:

$$\Delta Tc > \Delta Tt + |\Delta Tobj| \quad (1)$$

where $\Delta Tc$ is a temperature change width in said temperature cycle, $\Delta Tt$ is a temperature width of said hysteresis curve, and $|\Delta Tobj|$ is an absolute value of a temperature change due to said infrared ray.

15. An infrared ray sensor comprising:

a plurality of heat sensors, which are arranged in a matrix, and each of which includes a film formed of a material in which resistivity of said material changes along a hysteresis curve depending on temperature change, wherein said heat sensing section receives an infrared ray to change said resistivity; and a control unit operating to each of said plurality of heat sensors such that said each heat sensor undergoes a temperature cycle, wherein said temperature cycle is composed of a temperature increasing process and a temperature decreasing process, and said resistivity of said material changes along a part of said hysteresis curve during said temperature cycle, and said control unit detects a temperature of said each heat sensor due to said infrared ray based on a result of said temperature cycle, wherein said control unit supplies pulse power to said each heat sensor for every temperature cycle, and wherein said temperature increasing process is performed through heat generation due to said pulse power, and said temperature decreasing process is performed through heat radiation.

16. An infrared ray sensor comprising:

a plurality of heat sensors, which are arranged in a matrix, and each of which includes a film formed of a material in which resistivity of said material changes along a hysteresis curve depending on temperature change, wherein said heat sensing section receives an infrared ray to change said resistivity; and a control unit operating to each of said plurality of heat sensors such that said each heat sensor undergoes a temperature cycle, wherein said temperature cycle is composed of a temperature increasing process and a temperature decreasing process, and said resistivity of said material changes along a part of said hysteresis curve during said temperature cycle, and said control unit detects a temperature of said each heat sensor due to said infrared ray based on a result of said temperature cycle, wherein said control unit supplies pulse power to said each heat sensor for every temperature cycle, and wherein said control unit supplies pulse power to said each heat sensor such that an inequality (1) is satisfied:

$$\Delta Tc > \Delta Tt + |\Delta Tobj| \quad (1)$$

where $\Delta Tc$ is a temperature change width in said temperature cycle, $\Delta Tt$ is a temperature width of said hysteresis curve, and $|\Delta Tobj|$ is an absolute value of a temperature change due to said infrared ray.

17. A method of detecting a temperature due to an infrared ray, comprising:

making a heat sensing section undergo temperature cycles, wherein said temperature cycle is composed of a temperature increasing process and a temperature decreasing process; and detecting a temperature due to said infrared ray based on a result of each of said temperature cycles, wherein said making includes supplying pulse power to said heat sensing section for every temperature cycle, and wherein said supplying includes performing said temperature increasing process through heat generation due to said pulse power, and said temperature decreasing process through heat radiation.

18. A method of detecting a temperature due to an infrared ray, comprising:

making a heat sensing section undergo temperature cycles, wherein said temperature cycle is composed of a temperature increasing process and a temperature decreasing process; and detecting a temperature due to said infrared ray based on a result of each of said temperature cycles, wherein said making includes supplying pulse power to said heat sensing section for every temperature cycle, and wherein said supplying includes supplying said pulse power to said heat sensing section such that an inequality (1) is satisfied:

$$\Delta Tc > \Delta Tt + |\Delta Tobj| \tag{1}$$

where $\Delta Tc$ is a temperature change width in said temperature cycle, $\Delta Tt$ is a temperature width of said hysteresis curve, and $|\Delta Tobj|$ absolute value of a temperature change due to said infrared ray.

* * * * *